United States Patent
Wei et al.

(10) Patent No.: US 8,315,021 B2
(45) Date of Patent: Nov. 20, 2012

(54) MOTOR DETECTING AND PROTECTING APPARATUS AND ITS METHOD

(75) Inventors: Chia-Pin Wei, Taoyuan Hsien (TW); Po-Tsun Kuo, Taoyuan Hsien (TW)

(73) Assignee: Delta Electronics, Inc., Kuei San, Taoyuan Hsien (TW)

( * ) Notice: Subject to any disclaimer, the term of this patent is extended or adjusted under 35 U.S.C. 154(b) by 463 days.

(21) Appl. No.: 12/397,813

(22) Filed: Mar. 4, 2009

(65) Prior Publication Data

US 2010/0149699 A1    Jun. 17, 2010

(30) Foreign Application Priority Data

Dec. 16, 2008   (TW) ................................ 97148984 A

(51) Int. Cl.
*H02H 7/00* (2006.01)

(52) U.S. Cl. ................... 361/31; 361/5; 361/6; 361/23; 361/24; 361/93.1; 361/91.1; 361/91.2; 318/432; 318/434

(58) Field of Classification Search .................. 361/93.1, 361/91.1, 91.2, 30, 31, 5, 6, 18, 23, 24, 87; 323/277, 284, 285; 318/432, 434
See application file for complete search history.

(56) References Cited

U.S. PATENT DOCUMENTS

| | | | | |
|---|---|---|---|---|
| 3,970,935 A | * | 7/1976 | Beery et al. | 324/166 |
| 3,978,393 A | * | 8/1976 | Wisner et al. | 323/272 |
| 4,142,482 A | * | 3/1979 | Asano et al. | 123/688 |
| 4,748,608 A | * | 5/1988 | Matsumoto et al. | 369/43 |
| 5,422,593 A | * | 6/1995 | Fujihira | 327/561 |
| 5,717,302 A | * | 2/1998 | Sakai et al. | 318/374 |
| 5,894,394 A | * | 4/1999 | Baba et al. | 361/87 |
| 6,054,823 A | * | 4/2000 | Collings et al. | 318/400.04 |
| 6,185,082 B1 | * | 2/2001 | Yang | 361/90 |
| 7,045,982 B2 | * | 5/2006 | Amakusa | 318/400.05 |
| 7,129,679 B2 | * | 10/2006 | Inaba et al. | 323/222 |
| 7,463,079 B2 | * | 12/2008 | De et al. | 327/379 |
| 7,633,274 B2 | * | 12/2009 | Nishino | 323/222 |
| 7,667,428 B2 | * | 2/2010 | Wei et al. | 318/809 |
| 7,710,702 B2 | * | 5/2010 | Kuo | 361/93.1 |
| 7,843,675 B2 | * | 11/2010 | Hirata | 361/93.1 |
| 7,855,535 B2 | * | 12/2010 | Tiew et al. | 323/274 |
| 7,928,704 B2 | * | 4/2011 | Huang | 323/271 |
| 2008/0043391 A1 | * | 2/2008 | Wong et al. | 361/59 |
| 2008/0298784 A1 | * | 12/2008 | Kastner | 388/811 |

* cited by examiner

*Primary Examiner* — Rita Leykin
(74) *Attorney, Agent, or Firm* — Muncy, Geissler, Olds & Lowe, PLLC

(57) ABSTRACT

A motor detecting and protecting apparatus electrically connected with a motor. The motor detecting and protecting apparatus includes a detecting unit, an error determining unit, a controlling unit and a driving unit. The detecting unit detects a state of the motor and outputs at least one first detecting signal and at least one second detecting signal to the error determining unit. The error determining unit has a first predetermined value, wherein the error determining unit outputs a warning signal to the controlling unit while a variation value between the first detecting signal and the second detecting signal exceeds the first predetermined value. And the controlling unit will control the motor to stop operating by the driving unit in accordance with the warning signal. And a motor detecting and protecting method is also disclosed.

14 Claims, 3 Drawing Sheets

MOTOR DETECTING AND PROTECTING APPARATUS AND ITS METHOD

CROSS REFERENCE TO RELATED APPLICATIONS

This Non-provisional application claims priority under 35 U.S.C. §119(a) on Patent Application No(s). 097148984, filed in Taiwan, Republic of China on Dec. 16, 2008, the entire contents of which are hereby incorporated by reference.

BACKGROUND OF THE INVENTION

1. Field of Invention

The present invention relates to a motor detecting and protecting apparatus and its method, and in particular to an apparatus and method capable of determining an instantaneous abnormal state of a motor by utilizing a voltage variation value, an electric current variation value or a rotation speed variation value as reference terms.

2. Related Art

As modern electronic products are rapidly developing along a trend towards higher performance, higher frequency, higher speed and more compactness, heat generated by the electronic products increases. However, electronic products may be unstable at high temperatures, adversely affecting their reliability. Thus, the dissipation of heat has become an important issue for current electronic products, and a fan is normally used as a heat dissipation device for keeping the normal operation of the electronic products.

When a fan or a motor operates, the circuit of the fan or the motor can be impacted by an instantaneous current or voltage that causes the current or voltage to shut down and damages the circuit or the motor of the fan. Also, over-heating can occur because the fan stops operating while the electronic apparatus normally cooled by the fan continues to operate. In order to solve the above-mentioned problems, an over-voltage apparatus or an over-current monitoring apparatus is usually used in a fan to protect the fan from being influenced by instantaneous over-current or instantaneous over-voltage events.

However, the fan using the over-voltage apparatus only can detect an over-voltage condition but cannot immediately detect an instantaneous voltage change and thus cannot effectively protect the fan or the motor. On the other hand, due to the slow response speed of detection, the fan or the motor using the over-current apparatus cannot instantaneously suppress the surge current, which is generated because the voltage changes, and thus the fan or the motor tends to be damaged easily. Therefore, neither the over-voltage apparatus nor the over-current apparatus can immediately detect the instantaneous current variation or instantaneous voltage variation, and thus both of them cannot effectively protect the fan or the motor. This may ultimately shorten the lifetime of the fan or the motor.

SUMMARY OF THE INVENTION

The present invention is to provide a motor detecting and protecting apparatus and its method, not only for detecting the over-current or the over-voltage of the motor by utilizing a maximum voltage value or a maximum electric current value, but also capable of detecting some abnormal states of the motor while the voltage or the electric current of the motor are not exceeding the maximum voltage value or the maximum electric current value, so as to prevent the unanticipated damage of the motor.

To achieve the above, the present invention discloses a motor detecting and protecting apparatus electrically connected with a motor, the motor detecting and protecting apparatus includes a detecting unit, an error determining unit, a controlling unit and a driving unit. The detecting unit detects a state of the motor and outputs at least one first detecting signal and at least one second detecting signal to the error determining unit. The error determining unit has a first predetermined value, and the error determining unit outputs a warning signal to the controlling unit while a variation value between the first detecting signal and the second detecting signal exceeds the first predetermined value. The controlling unit will control the motor to stop operating by the driving unit in accordance with the warning signal.

To achieve the above, the present invention also discloses a motor detecting and protecting apparatus electrically connected with a motor, the motor detecting and protecting apparatus includes a detecting unit, an error determining unit, a controlling unit and a driving unit. The detecting unit detects a state of the motor and outputs at least one first detecting signal and at least one second detecting signal to the error determining unit. The error determining unit has a first predetermined value, the error determining unit outputs a warning signal to the controlling unit while a variation value between the first detecting signal and the second detecting signal exceeds the first predetermined value. Also, the controlling unit is also electrically connected with the detecting unit for receiving the first detecting signal, the second detecting signal and the warning signal, and the controlling unit further has a second predetermined value. When the first detecting signal or the second detecting signal is lower than the second predetermined value or when the controlling unit receives the warning signal, the controlling unit stops to output a controlling signal and the motor stops operating.

To achieve the above, the present invention also discloses a motor detecting and protecting method which firstly detects a state of a motor and outputs at least one first detecting signal and at least one second detecting signal, then obtains a variation value between the first detecting signal and the second detecting signal and determines whether the variation value exceeds a first predetermined value, and when the variation value exceeds the first predetermined value, the method generates a warning signal to control the motor to stop operating.

BRIEF DESCRIPTION OF THE DRAWINGS

The present invention will be fully understood from the subsequent detailed description and accompanying drawings, which are given by way of illustration only, and thus are not limitative of the present invention, and wherein.

DETAILED DESCRIPTION OF THE INVENTION

The preferred embodiments of the motor detecting and protecting apparatus and its method of the present invention will be apparent from the following detailed description, which proceeds with reference to the accompanying drawings, wherein the same references relate to the same elements.

Figure 1:
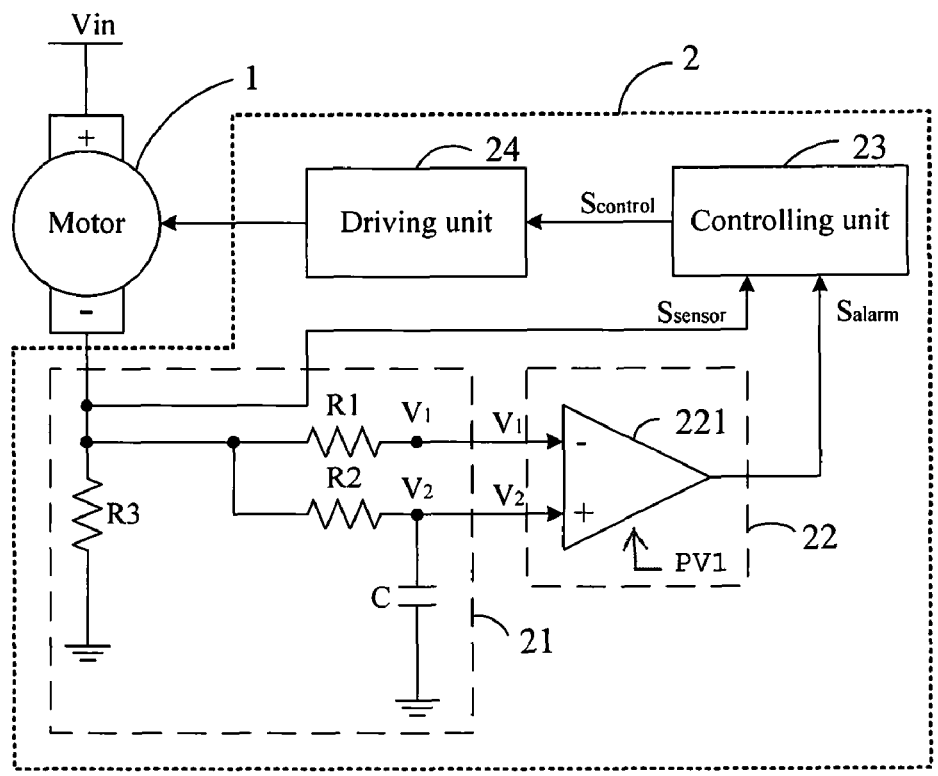
FIG. 1 is a circuit block diagram of a motor detecting and protecting apparatus according to a first embodiment of the present invention.

Please refer to FIG. 1, a motor detecting and protecting apparatus 2 according to a first embodiment of the present invention is electrically connected with a motor 1. The motor detecting and protecting apparatus 2 includes a detecting unit 21, an error determining unit 22, a controlling unit 23 and a driving unit 24. The motor detecting and protecting apparatus 2 and the motor 1 can be applied to a fan (not shown).

In the first embodiment, the detecting unit 21 has a first resistance R1, a second resistance R2, a third resistance R3 and a capacitor C. The first end of the first resistance R1 is electrically connected with the motor 1, and the second end of the first resistance R1 is electrically connected with the error determining unit 22. The first end of the second resistance R2 is electrically connected with the motor 1 and the first end of the first resistance R1, and the second end of the second resistance R2 is electrically connected with the error determining unit 22. The first end of the third resistance R3 is electrically connected with the motor 1, the first end of the first resistance R1 and the first end of the second resistance R2, and the second end of the third resistance R3 is grounding; and the first end of the capacitor C is electrically connected with the second end of the second resistance R2, and the second end of the capacitor C is grounding. The first resistance R1 and the second resistance R2 receive the electric current flowing through the motor respectively and generate a first voltage V1 (first detecting signal) and a second voltage V2 (second detecting signal) at the first resistance R1 and the second resistance R2 respectively. In this embodiment, the resistance value of the first resistance R1 and the second resistance R2 are the same. Therefore, the first voltage V1 and the second voltage V2 will be the same when the operation of the motor 1 is normal.

The error determining unit 22 has a first predetermined value which is zero, and the error determining unit 22 can be a comparator 221 having a first input end, a second input end, a third input end and an output end, the first input end is electrically connected with a second end of the first resistance R1 for receiving the first voltage V1, the second input end is electrically connected with the first end of the capacitor C, the second end of the second resistance R2 for receiving the second voltage V2 and the third input end for receiving the first predetermined value PV1; wherein when the current intensity of the electric current flowing through the motor is changed, resulting in the accompanying change of the first voltage V1 and the second voltage V2. However, because of the electricity storing of the capacitor C, the change of the second voltage V2 is gradual. Accordingly, the first voltage V1 and the second voltage V2 received by the comparator 221 are not the same at the moment of current changing. Thus, the variation value between the first voltage V1 and the second voltage V2 exceeds the first predetermined value, and the comparator 221 outputs a warning signal $S_{alarm}$ immediately. The error determining unit 22 is not limited to the comparator 221, the error determining unit 22 also can be a microprocessor or a microcontroller.

The controlling unit 23 is electrically connected with the output end of the error determining unit 22, when the warning signal $S_{alarm}$ outputted from the comparator 221 is received by the controlling unit 23, the controlling unit 23 stops to output a controlling signal $S_{control}$ to the driving unit 24, so as to make the coils (not shown) of the motor 1 can not change electrode and to stop the operation of the motor. The controlling unit 23 can be a motor driving IC, a microprocessor or a microcontroller. And the driving unit 24 can be a full-bridge circuit or a half-bridge circuit.

Or, the first predetermined value is a voltage variation value, and the error determining unit 22 can be built-in the controlling unit 23, so that the controlling unit 23 has a first predetermined value, and the controlling unit 23 is electrically connected with the second end of the first resistance R1, the second end of the second resistance and the first end of the capacitor respectively for receiving the first voltage V1 and the second voltage V2. When the current intensity of the electric current flowing through the motor is changed, it results in the accompanying change of the first voltage V1 and the second voltage V2. However, because of the electricity storing of the capacitor C, the change of the second voltage V2 is gradual. Accordingly, the first voltage V1 and the second voltage V2 received by the controlling unit 23 (the error determining unit 22) are not the same at the moment of current changing. Also, when the variation value between the first voltage V1 and the second voltage V2 exceeds the first predetermined value, the error determining unit 22 determines that the motor 1 is abnormal and outputs the warning signal $S_{alarm}$, and the controlling unit 23 stops to output the controlling signal $S_{control}$ to the driving unit 24, so that the driving unit 24 stops to drive the motor to operate. The controlling unit 23 can be a microprocessor or a microcontroller, and the error determining unit 22 can be a computer program which could be read in by the microprocessor or the microcontroller.

Figure 2:
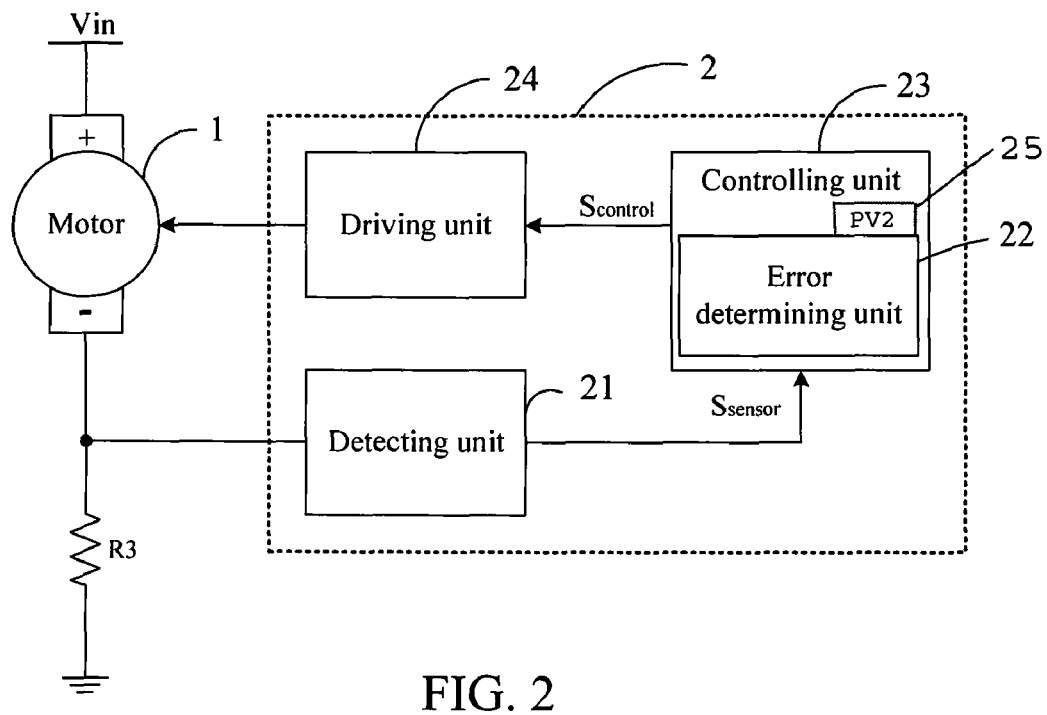
FIG. 2 is a circuit block diagram of a motor detecting and protecting apparatus according to a second embodiment of the present invention.

Please refer to FIG. 2, the detecting unit 21 of the motor detecting and protecting apparatus 2 according to a second embodiment of the present invention can be a voltage detecting element or an electric current detecting element. The detecting unit 21 detects the voltage or the electric current of the motor 1 every a regular time interval and outputs the first detecting signal (a voltage value or an electric current value) and the second detecting signal (a voltage value or an electric current value) alternately according to the regular time interval. The error determining unit 22 has a first predetermined value which is a voltage variation value or an electric current variation value. When the difference (variation value) between the first detecting signal and the second detecting signal exceeds the first predetermined value, the error determining unit 22 outputs a warning signal $S_{alarm}$ to the controlling unit 23, so as to inform the controlling unit 23 to control the driving unit 24 to stop the operation of the motor 1. Otherwise, the error determining unit 22 also can be built-in the controlling unit 23 in this embodiment.

Figure 3:
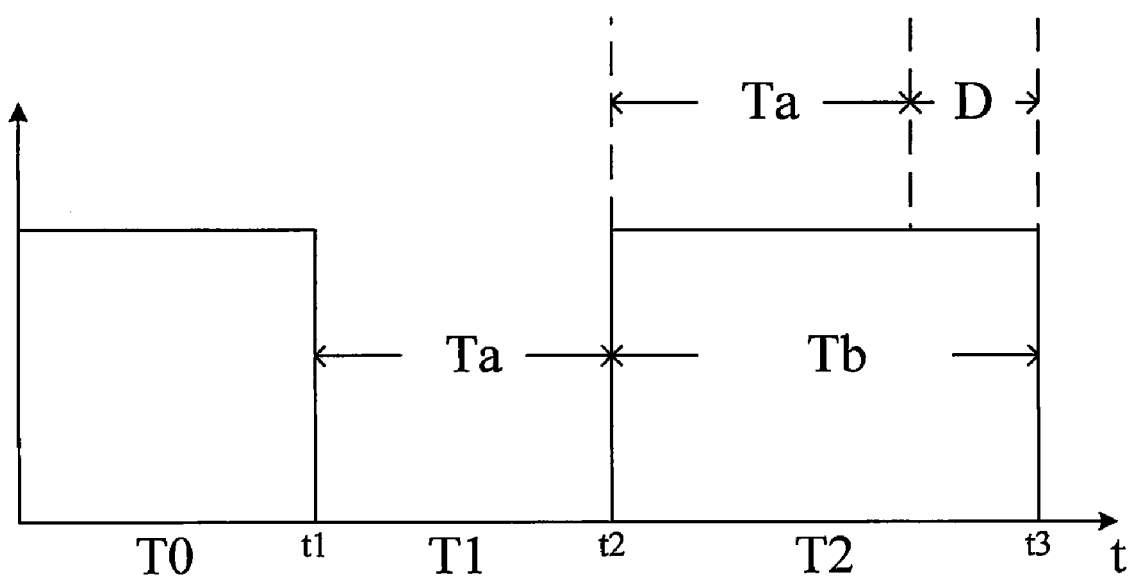
FIG. 3 is a diagram showing the relationship between the rotation speed and the time in the motor of the present invention.

Or, the detecting unit 21 can be a rotation speed detecting element for detecting the rotation speed of the motor every a regular time interval and outputs a feedback signal including the first detecting signal and the second detecting signal alternately according to the regular time interval, and the first detecting signal and the second detecting signal of the feedback signal are rotation speed valus respectively. The error determining unit 22 includes a counter electrically connected with the rotation speed detecting element for receiving the first detecting signal and the second detecting signal and counting the duration of the first detecting signal (t1 or t2 in FIG. 3 for example) and the duration of the second detecting signal (t2 or t3 in FIG. 3 for example), and the first predetermined value is a time variation value, wherein when a time variation value between the duration of the first detecting signal and the duration of second detecting signal (Tb−Ta=D in FIG. 3 for example) exceeds the first predetermined value, the error determining unit 22 outputs the warning signal to the controlling unit 23 to control the driving unit 24 to stop the operation of the motor 1.

Or, please refer to FIG. 1 and FIG. 2, the controlling unit 23 can be electrically connected with the detecting unit 21 directly for receiving the first detecting signal and the second detecting signal, and the controlling unit 23 further includes a second predetermined value (PV2) 25. The detecting unit 21 can be a voltage detecting element, an electric current detecting element or a rotation speed detecting element, and the first detecting signal and the second detecting signal can be voltage values, electric current values or rotation speed values, and the second predetermined value can be accordingly a maximum voltage value, a maximum electric current value or a minimum rotation speed value for allowing the controlling unit 23 to output the controlling signal $S_{control}$ to the driving unit 24 for driving the motor 1 to operate. When the first detecting signal or the second detecting signal is lower than the second predetermined value, the controlling unit 23 stops to output the controlling signal $S_{control}$ and the motor 1 stops operating.

Moreover, the controlling unit 23 further has a reset value. The reset value includes a first value and a second value for determining a number of restart times of the motor 1 and the time interval between each restart of the motor 1 respectively. After the controlling unit 23 stops the operation of the motor 1, the controlling unit 23 will output a controlling signal $S_{control}$ in accordance with the reset value for restarting the operation of the motor 1. But if the steps described above can not restart the motor 1 (the motor 1 is abnormal), the controlling unit 23 stops to output the controlling signal $S_{control}$ to the driving unit 24, so as to stop driving the operation of the motor 1.

Figure 4:
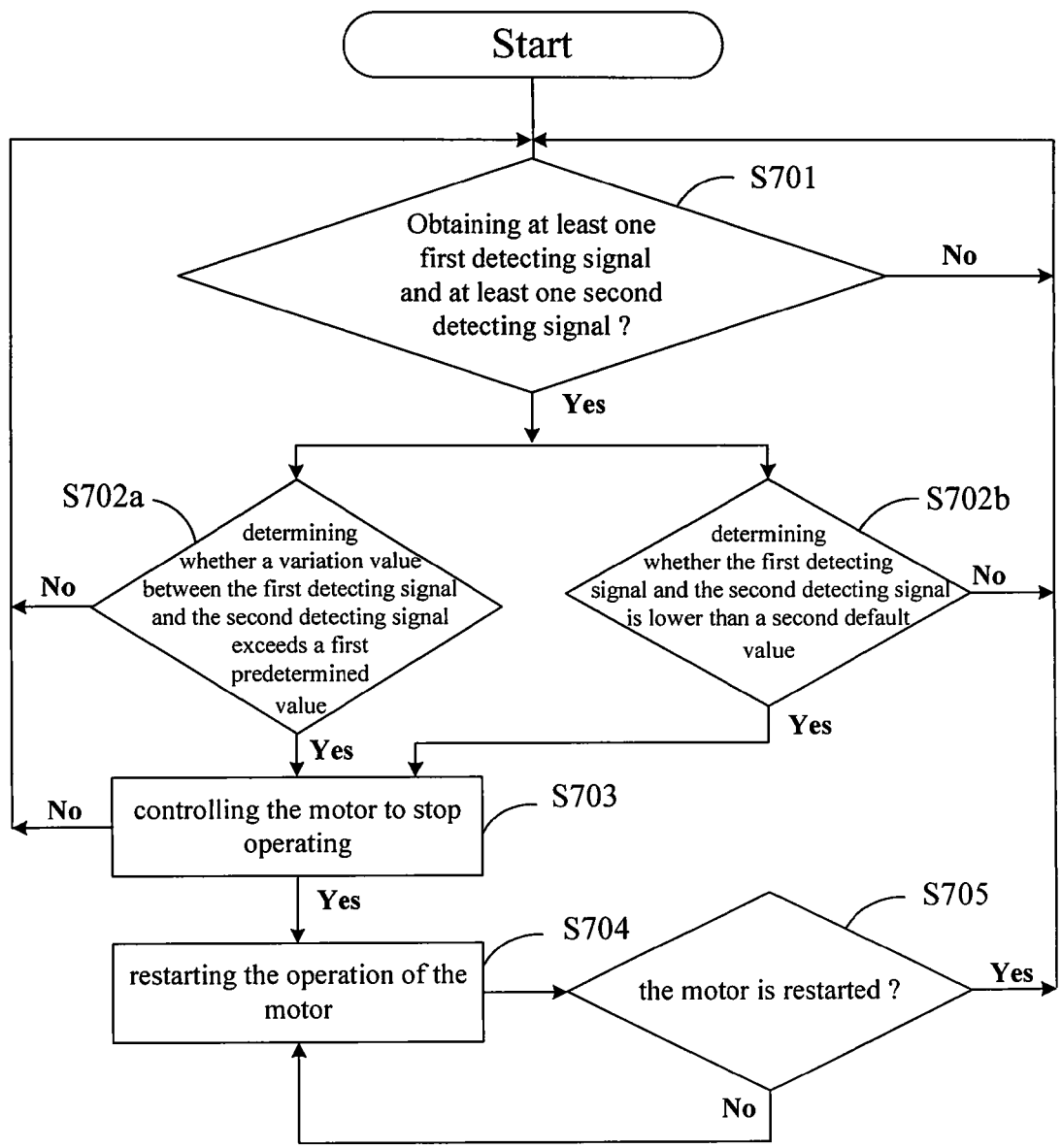
FIG. 4 is a flow chart of a motor detecting and protecting method according to the present invention.

As shown in FIG. 4, the motor detecting and protecting method of the present invention includes the steps of: detecting a state (voltage, electric current or rotation speed for example) of the motor 1 and outputting at least one first detecting signal (a voltage value, an electric current value or a rotation speed value for example) and at least one second detecting signal (a voltage value, an electric current value or a rotation speed value for example) (S701) to the error determining unit 22 by the detecting unit 21 (a voltage detecting element, an electric current detecting element or a rotation speed detecting element for example); the error determining unit 22 has a first predetermined value (a voltage variation value, an electric current variation value or a rotation speed variation value for example), and while a variation value between the first detecting signal and the second detecting signal exceeds the first predetermined value (S702a), the error determining unit 22 outputs a warning signal $S_{alarm}$ to the controlling unit 23, and then the controlling unit 23 will stop outputting the controlling signal $S_{control}$ to the driving unit 24 for controlling the motor 1 to stop operating (S703).

The motor detecting and protecting method of the present invention further includes the steps of: outputting at least one first detecting signal (a voltage value, an electric current value or a rotation speed value for example) and at least one second detecting signal (a voltage value, an electric current value or a rotation speed value for example) (S701) which is detected by the detecting unit 21 to the controlling unit 23, the controlling unit 23 has a second predetermined value (a maximum voltage value, a maximum electric current value or a minimum rotation speed value for allowing the motor to operate for example), and when the first detecting signal or the second detecting signal is lower than the second predetermined value (S702b), the controlling unit 23 will stop outputting the controlling signal $S_{control}$ to the driving unit 24 for controlling the motor 1 to stop operating (S703).

The motor detecting and protecting method of the present invention further includes the steps of: after the controlling unit 23 stops the operation of the motor 1 (S703), the controlling unit 23 will output a controlling signal $S_{control}$ to the driving unit 24 in accordance with the reset value for restarting the operation of the motor 1 (S704), wherein the reset value includes a first value and a second value for determining a number of restart times of the motor 1 and the time interval between each restart of the motor 1 respectively.

In summary, the motor detecting and protecting apparatus and its method of the present invention can determine an instantaneous abnormal state of a motor by utilizing a voltage variation value, an electric current variation value or a rotation speed variation value as reference terms, i.e. the motor detecting and protecting apparatus and its method not only prevents the over-current, the over-voltage or the under rotation speed of the motor by detecting the voltage, the electric current or the rotation speed of the motor and by utilizing the second predetermined value (the maximum voltage value, the maximum electric current value or the minimum rotation speed value), but also prevents the unanticipated damage of the motor by generating the warning signal to stop the operation of the motor immediately when electric current, voltage or rotation speed of the motor is changed in an instant. Also, the motor detecting and protecting apparatus of the present invention restart the operation of the motor while the state motor returns to normal and stable, so as to lengthen the lifetime of the motor.

Although the present invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the present invention.

What is claimed is:

1. A motor detecting and protecting apparatus electrically connected with a motor, the motor detecting and protecting apparatus comprising:

a detecting unit detecting a state of the motor and outputting at least one first detecting signal and at least one second detecting signal, the detecting unit including:

a first resistance having a first end electrically connected with the motor for receiving an electric current flowing through the motor and generating a first voltage;

a second resistance having a first end electrically connected with the motor and the first end of the first resistance for receiving the electric current flowing through the motor and generating a second voltage; and a capacitor having a first end electrically connected with a second end of the second resistance;

wherein when an electric current flowing through the motor changes, the first voltage and second voltage are changed, with the second voltage changing more gradually than the first voltage due to electrical storage of the capacitor; and wherein the first voltage and the second voltage are the first detecting signal and the second detecting signal, respectively;

an error determining unit, electrically connected with the detecting unit, for receiving the first detecting signal and the second detecting signal, wherein the error determining unit has a first predetermined value, and the error determining unit outputs a warning signal while a variation value between the first detecting signal and the second detecting signal exceeds the first predetermined value; and a controlling unit, electrically connected with the error determining unit, for receiving the warning signal and stopping an operation of the motor in accordance with the warning signal, the controlling unit having a reset value, after the controlling unit stops the operation of the motor, the controlling unit outputs a controlling signal in accordance with the reset value for restarting the operation of the motor, wherein the reset value comprises a first value and a second value for respectively determining a number of restart times of the motor and the time interval between each restart of the motor.

2. The motor detecting and protecting apparatus according to claim 1, wherein the error determining unit is a comparator, which comprises a first input end, a second input end and an output end, the first input end is electrically connected with a second end of the first resistance for receiving the first voltage, the second input end is electrically connected with the first end of the capacitor and the second end of the second resistance for receiving the second voltage;
wherein when the current intensity of the electric current flowing through the motor is changed and a variation value between the first voltage and the second voltage exceeds the first predetermined value, the comparator outputs the warning signal.

3. The motor detecting and protecting apparatus according to claim 1, wherein the error determining unit is built-in the controlling unit, the controlling unit is electrically connected with a second end of the first resistance, the second end of the second resistance and the first end of the capacitor respectively for receiving the first voltage and the second voltage; wherein when the current intensity of the electric current flowing through the motor is changed and a variation value between the first voltage and the second voltage exceeds the first predetermined value, the controlling unit outputs the warning signal.

4. The motor detecting and protecting apparatus according to claim 3, wherein the first predetermined value is a variation value of voltage, and when a variation value between the first voltage and the second voltage exceeds the first predetermined value, the error determining unit, which is built-in the controlling unit, outputs the warning signal.

5. The motor detecting and protecting apparatus according to claim 1, wherein the error determining unit is built-in the controlling unit, the detecting unit detects the state of the motor every a regular time interval and outputs the first detecting signal and the second detecting signal alternately according to the regular time interval, when a variation value between the first detecting signal and the second detecting signal exceeds the first predetermined value, the controlling unit outputs the warning signal.

6. The motor detecting and protecting apparatus according to claim 5, wherein the detecting unit is a voltage detecting element or an electric current detecting element, and then both the first detecting signal and the second detecting signal are voltage values or electric current values accordingly, and the first predetermined value is a voltage variation value or an electric current variation value.

7. The motor detecting and protecting apparatus according to claim 1, wherein the detecting unit is a rotation speed detecting element for detecting the rotation speed of the motor every a regular time interval and outputs a feedback signal, including the first detecting signal and the second detecting signal alternately according to the regular time interval, and the first detecting signal and the second detecting signal are rotation speed values, respectively.

8. The motor detecting and protecting apparatus according to claim 1, further comprising a driving unit electrically, respectively connected with the motor and the controlling unit, for receiving a controlling signal outputted from the controlling unit and driving the motor to operate in accordance with the controlling signal; wherein when the driving unit does not receive the controlling signal, the motor stops operating.

9. The motor detecting and protecting apparatus according to claim 8, wherein the controlling unit is electrically connected with the detecting unit for receiving the first detecting signal and the second detecting signal, and the controlling unit further comprises a second predetermined value; wherein when the first detecting signal or the second detecting signal is lower than the second predetermined value, the controlling unit stops to output the controlling signal and the motor stops operating.

10. The motor detecting and protecting apparatus according to claim 9, wherein the detecting unit is a voltage detecting element or an electric current detecting element, then the first detecting signal and the second detecting signal are voltage values or electric current values accordingly, and the first predetermined value is a voltage variation value or an electric current variation value, and the second predetermined value is a maximum voltage value or a maximum electric current value for allowing the controlling unit to output the controlling signal, so as to drive the motor to operate; or
the detecting unit is a rotation speed detecting element, the first detecting signal and the second detecting signal are rotation speed values, the first predetermined value is a rotation speed variation value, and the second predetermined value is a minimum rotation speed value for allowing the controlling unit to output the controlling signal, so as to drive the motor to operate.

11. A motor detecting and protecting method, comprising steps of:
detecting a state of a motor and outputting at least one first detecting signal and at least one second detecting signal;
wherein when an electric current flowing through the motor changes, the first detecting signal and the second detecting signal are changed, with the second detecting signal changing more gradually than the first detecting signal due to electrical storage of a capacitor;
obtaining a variation value between the first detecting signal and the second detecting signal; and
determining whether the variation value exceeds a first predetermined value;
wherein when the variation value exceeds the first predetermined value, outputting a warning signal to control the motor to stop operating;
after the motor stops operating, outputting a controlling signal in accordance with a reset value for restarting the operation of the motor, wherein the reset value comprises a first value and a second value for determining a number of restart times of the motor and the time interval between each restart of the motor respectively.

12. The motor detecting and protecting method according to claim 11, wherein the step of detecting the state of the motor and outputting the first detecting signal and the second detecting signal is: detecting the state of the motor every a regular time interval and outputting the first detecting signal and the second detecting signal alternately according to the regular time interval.

13. The motor detecting and protecting method according to claim 11, wherein the first detecting signal and the second detecting signal are voltage values, electric current values or rotation speed values, and the first predetermined value is a voltage variation value, an electric current variation value or a rotation speed variation value accordingly.

14. The motor detecting and protecting method according to claim 11, further comprising a step of: comparing the first detecting signal and the second detecting signal with a second predetermined value, wherein the first detecting signal and the second detecting signal are voltage values, electric current values or rotation speed values, the second predetermined value is a maximum voltage value, a maximum electric current value or a minimum rotation speed value for allowing the motor to operate, and when the first detecting signal or the second detecting signal is lower than the second predetermined value, the motor stops operating.

\* \* \* \* \*